(12) United States Patent
Kumar et al.

(10) Patent No.: US 12,361,738 B2
(45) Date of Patent: Jul. 15, 2025

(54) MACHINE LEARNING MODEL-AGNOSTIC CONFIDENCE CALIBRATION SYSTEM AND METHOD

(71) Applicant: Intuit Inc., Mountain View, CA (US)

(72) Inventors: Sricharan Kallur Palli Kumar, Mountain View, CA (US); Thrathorn Rimchala, San Francisco, CA (US); Hui Chen, Frisco, TX (US); Preeti Duraipandian, Plano, TX (US); Dominic Miguel Rossi, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 920 days.

(21) Appl. No.: 17/246,383

(22) Filed: Apr. 30, 2021

(65) Prior Publication Data

US 2022/0351088 A1    Nov. 3, 2022

(51) Int. Cl.
| | |
|---|---|
| *G06V 30/41* | (2022.01) |
| *G06F 18/243* | (2023.01) |
| *G06N 3/047* | (2023.01) |
| *G06N 20/20* | (2019.01) |
| *G06V 30/10* | (2022.01) |
| *G06V 30/148* | (2022.01) |

(52) U.S. Cl.
CPC ........ *G06V 30/41* (2022.01); *G06F 18/24323* (2023.01); *G06N 3/047* (2023.01); *G06N 20/20* (2019.01); *G06V 30/153* (2022.01); *G06V 30/10* (2022.01)

(58) Field of Classification Search
CPC ...... G06V 30/41; G06V 30/153; G06V 30/10; G06F 18/24323; G06N 3/047; G06N 20/20; G06N 3/045; G06N 5/01; G06N 7/01
See application file for complete search history.

(56) References Cited

U.S. PATENT DOCUMENTS

| | | | |
|---|---|---|---|
| 11,501,210 B1 * | 11/2022 | Zhdanov | ................. G06N 5/04 |
| 2018/0025222 A1 * | 1/2018 | Yellapragada | ....... G06V 30/416 382/176 |
| 2021/0287081 A1 * | 9/2021 | Saito | ...................... G06F 18/24 |
| 2022/0300834 A1 * | 9/2022 | Zeng | .................... G06F 40/284 |

* cited by examiner

*Primary Examiner* — John T Repsher, III
(74) *Attorney, Agent, or Firm* — Lathrop GPM LLP

(57) ABSTRACT

A method may include extracting, from a document, a first key-value pair including a key and a first value and corresponding to a first confidence score, extracting a second key-value pair including the key and a second value corresponding to a second confidence score, classifying a first match probability for the first key-value pair and a second match probability for the second key-value pair, generating a first calibrated confidence score for the first confidence score and a second calibrated confidence score for the second confidence score by transforming, using precision lookup tables constructed from training records, the first match probability to the first calibrated confidence score and the second match probability to second calibrated confidence score, selecting, using the first and second calibrated confidence scores, one of the first key-value pair and the second key-value pair, and presenting, in a graphical user interface (GUI), the selected key-value pair.

17 Claims, 7 Drawing Sheets

MACHINE LEARNING MODEL-AGNOSTIC CONFIDENCE CALIBRATION SYSTEM AND METHOD

BACKGROUND

Outputs generated by machine learning models are typically accompanied by confidence scores. For example, a machine learning classifier may classify an input as a specific class with a corresponding confidence score that indicates the likelihood that the input is actually in the class given the model's internal representations (input-output mapping) learned from training datasets. However, the confidence scores of machine learning models (e.g., deep learning models) may not be easily interpretable by the end users of the model. For example, extracting information from documents (e.g., scanned documents) using machine learning is often a multi-step pipeline where each step is associated with individual machine learning models. However, confidence scores often measure the confidence of only one of the steps in the multi-step process. In addition, comparing and/or calibrating confidence scores generated by different machine learning models may be challenging when the different machine learning models generate confidence scores by different methods. Furthermore, techniques for calibrating confidence scores are typically not generalizable to arbitrary "black box" machine learning models.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including extracting, from a document, a first key-value pair including a key and a first value. The first key-value pair corresponds to a first confidence score. The method further includes extracting, from the document, a second key-value pair including the key and a second value. The second key-value pair corresponds to a second confidence score. The method further includes classifying a first match probability for the first key-value pair and a second match probability for the second key-value pair, and generating a first calibrated confidence score corresponding to the first confidence score and a second calibrated confidence score corresponding to the second confidence score by transforming, using precision lookup tables constructed from training records, the first match probability to the first calibrated confidence score and the second match probability to second calibrated confidence score. The method further includes selecting, using the first calibrated confidence score and the second calibrated confidence score, one of the first key-value pair and the second key-value pair to obtain a selected key-value pair, and presenting, in a graphical user interface (GUI), the selected key-value pair.

In general, in one aspect, one or more embodiments relate to a system including a computer processor, and a first extractor configured to extract, from a document, a first key-value pair comprising a key and a first value. The first key-value pair corresponds to a first confidence score. The system further includes a second extractor configured to extract, from the document, a second key-value pair comprising the key and a second value. The second key-value pair corresponds to a second confidence score. The system further includes a calibrator executing on the computer processor and configured to classify a first match probability for the first key-value pair and a second match probability for the second key-value pair, and generate a first calibrated confidence score corresponding to the first confidence score and a second calibrated confidence score corresponding to the second confidence score by transforming, using precision lookup tables constructed from training records, the first match probability to the first calibrated confidence score and the second match probability to second calibrated confidence score. The system further includes a confidence based selector configured to select, using the first calibrated confidence score and the second calibrated confidence score, one of the first key-value pair and the second key-value pair to obtain a selected key-value pair. The system further includes a graphical user interface (GUI) configured to present the selected key-value pair.

In general, in one aspect, one or more embodiments relate to a method including sending a document to a calibrator configured to perform obtaining, from the document, a first key-value pair comprising a key and a first value. The first key-value pair corresponds to a first confidence score. The calibrator is further configured to perform obtaining, from the document, a second key-value pair comprising the key and a second value. The second key-value pair corresponds to a second confidence score. The calibrator is further configured to perform classifying a first match probability for the first key-value pair and a second match probability for the second key-value pair, and generating a first calibrated confidence score corresponding to the first confidence score and a second calibrated confidence score corresponding to the second confidence score by transforming, using precision lookup tables constructed from training records, the first match probability to the first calibrated confidence score and the second match probability to second calibrated confidence score. The calibrator is further configured to perform selecting, using the first calibrated confidence score and the second calibrated confidence score, one of the first key-value pair and the second key-value pair to obtain a selected key-value pair, and presenting, in a graphical user interface (GUI), the selected key-value pair.

Other aspects of the invention will be apparent from the following description and the appended claims.

DETAILED DESCRIPTION

Figure 1A:
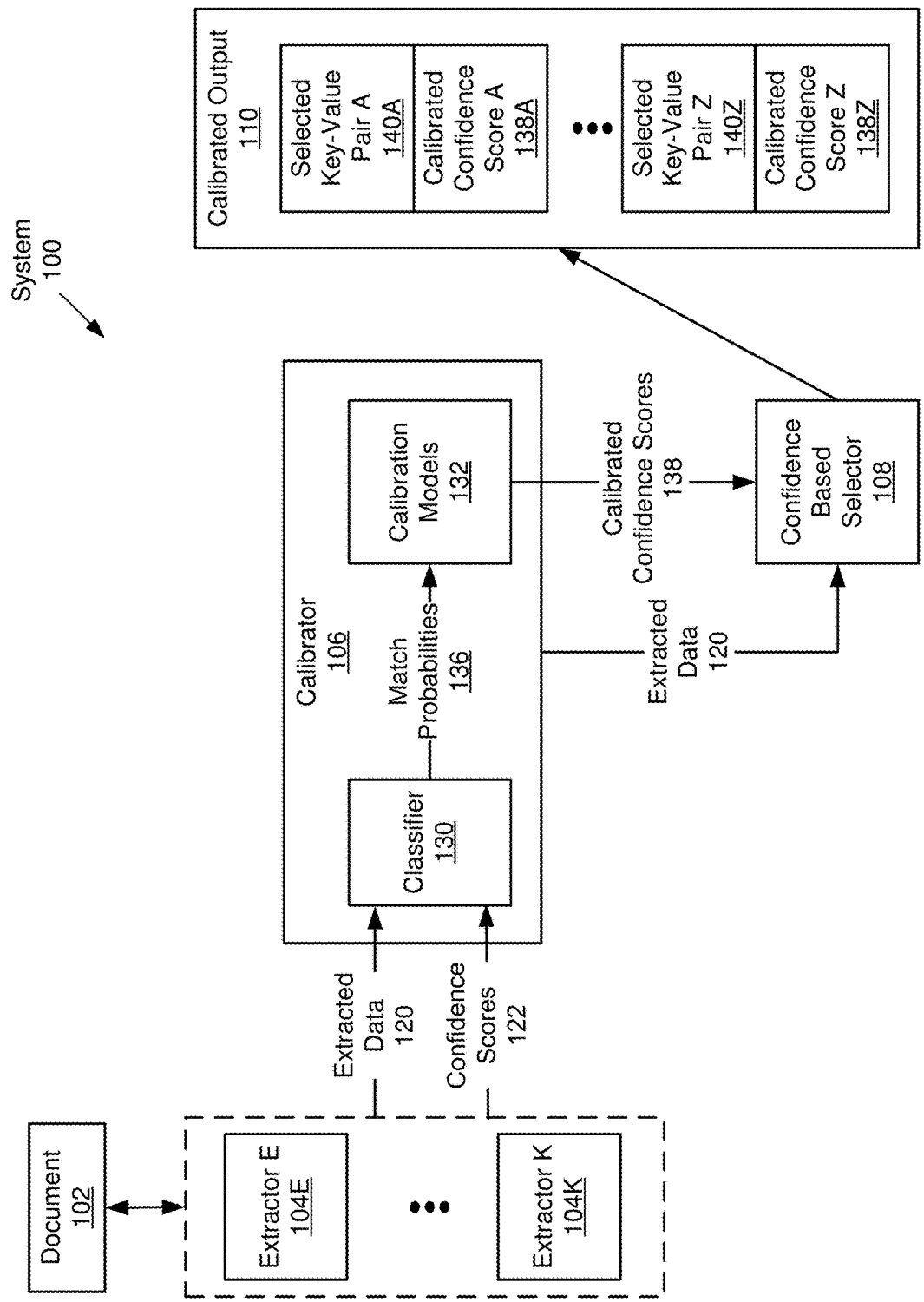
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a machine learning architecture for computer system prediction of confidence scores. The machine learning model architecture organizes a classifier on top of extractors. The classifier classifies the output of the extractor that extracts information from a document. The classification from the classifier is a match probability. A calibration model learns to predict match probabilities and precisions based on the input features derived from a raw document and outputs of document extractors. Through the predicted precisions and probabilities, a better demarcation between good extracted values and bad extracted values is achieved.

By way of a more detailed overview, a document includes multiple values, with values having a corresponding explicitly or implicitly defined key. Key-value pairs are extracted from a document. Multiple key-value pairs may be extracted for the same field of the document using multiple extraction models. Before generating the final outputs, the most correct extracted value is selected for every field among the outputs generated from multiple extraction models. The extraction of a key-value pair by an extractor has a confidence score indicating a probability that the extracted value belongs to the predicted key based on the input features to the extractors. Thus, the output of each extractor is the set of key-value pairs and the corresponding confidence scores. However, at this stage, the confidence scores may not directly correspond to the match probability leading to challenges in computer based selection of the key-value pairs. Thus, the confidence scores are calibrated in accordance with embodiments of the disclosure.

To calibrate a confidence score, match probabilities are generated by applying a classifier to feature vectors generated from the key-value pairs. A match probability is a probability that the extracted key-value pair is a "true positive" value. Namely, the extracted key-value pair matches the actual key-value pair in the document. Calibrated confidence scores corresponding to the confidence scores are generated by applying calibration models to the match probabilities for each document field individually. The calibration models generate the calibrated confidence scores by obtaining precisions corresponding to the match probabilities. Each field's calibration model calculates the precision using the number of true positives corresponding to the match probability in training data and the number of false positives corresponding to the match probability in the training data.

The calibrated confidence scores are used to select key-value pairs for inclusion in final output. Thus, the calibrated confidence scores represent a more precise measure of confidence in the extracted key-value pairs than the original possibly noisy and unreliable confidence scores. Thus, the calibrated confidence scores may be more useful for driving downstream decisions and/or optimizations. In addition, the disclosed invention may be applied to any extraction model. If the calibrated confidence score corresponding to a key-value pair is below a threshold, the key-value pair may be presented with a visual cue indicating a low calibrated confidence score (i.e., low precision). Displaying a key-value pair with a low calibrated confidence score using a visual cue improves the user experience by focusing the user's attention on low-precision data (e.g., when reviewing the results of document extraction). Because precision, unlike probability, is calculated using true positives and false positives, highlighting low-precision data is more useful than highlighting low-probability data. For example, incorrect values with high confidence (i.e., False Positives) may be harmful to a user's review experience, while True Negatives (i.e., incorrect values with low confidence) are less consequential to the users.

FIG. 1A shows a diagram of a system (100) in accordance with one or more embodiments. As shown in FIG. 1A, the system (100) includes multiple components such as a document (102), extractors (104E, 104K), a calibrator (106), a confidence based selector (108), and calibrated output (110). Each of these components is described below.

A document (102) is any type of written matter that captures information. For example, the document (102) may be a form, a spreadsheet, a presentation, a word processing application document, or other such document. By way of an example, the document (102) may be a compliance form (e.g., audit form, data security form, tax form, medical form, privacy policy, etc.) to be completed by a user, and designed to comply with the regulations of a government agency. For example, the compliance form may be specific to a jurisdiction (e.g., a geographic region such as a state, country, region, municipality, reinvestment zone, etc.). In one or more embodiments, the document (102) is a freeform document whose text lacks explicitly defined fields. For example, the fields of the document (102) may be implicitly defined, such as with section headers, surrounding words and context, etc. The document (102) may correspond to a document type. The document type is a category that describes the document (102). For example, the document type may be a general category, such as tax document, payroll document, or legal document. Alternatively, the document type may be a specific category, such as Schedule 1 of a Federal Tax Form, etc.

Figure 1B:
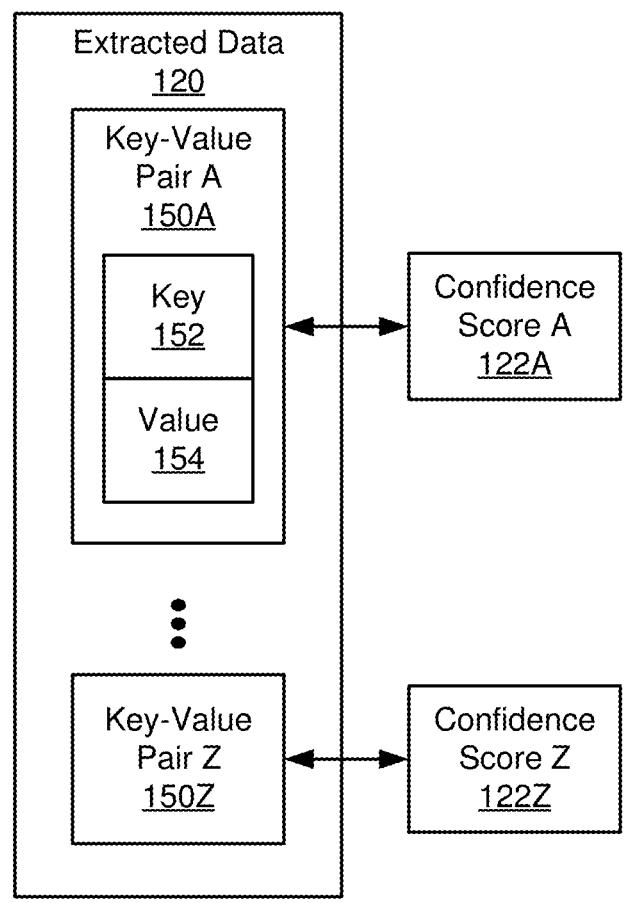
Figure 5A:
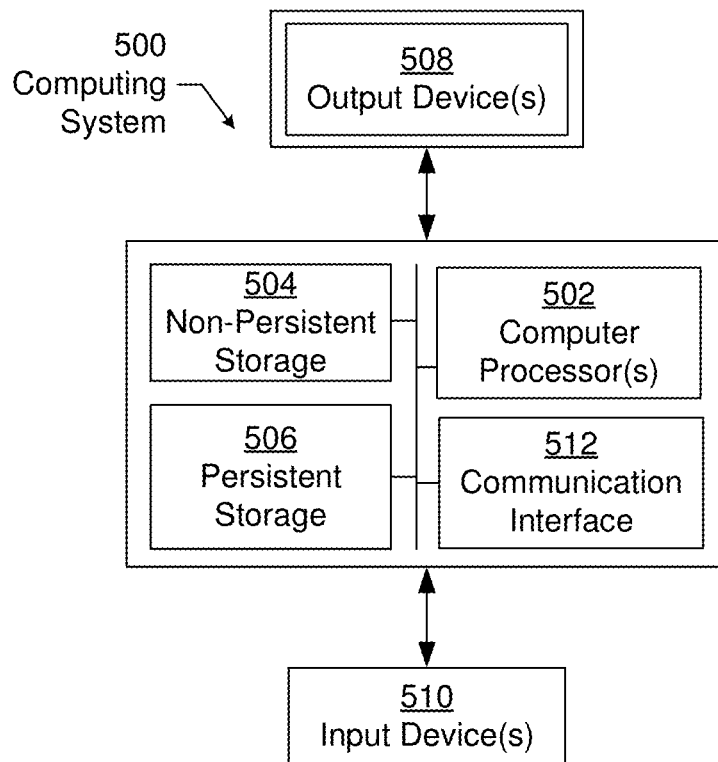
FIG. 5A and FIG. 5B show computing systems in accordance with one or more embodiments of the invention.
Figure 5B:
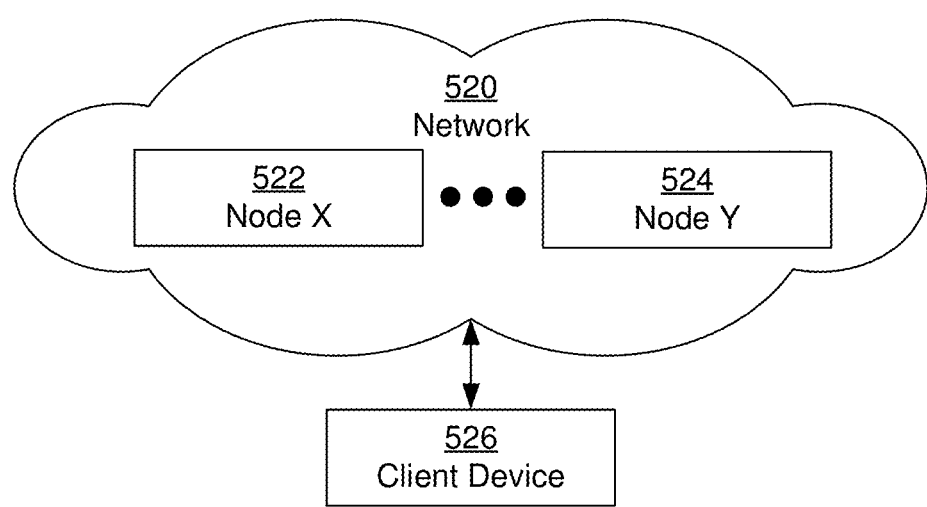

Each extractor (104E, 104K) may be executed on a computing system (e.g., the computing system (500) of FIG. 5A) connected to a network (e.g., the network (520) as shown in FIG. 5B). An extractor (104E) includes functionality to extract extracted data (120) from a document (102). Turning to FIG. 1B, the extracted data (120) includes one or more key-value pairs (150A, 150Z) corresponding to confidence scores (122A, 122Z). A key-value pair (150A) includes a key (152) and a value (154). The key (152) is an identifier of a field of the document (102). For example, the key (152) may be a field name (e.g., field title text that explicitly appears in the document or an implicit field type). Alternatively, if the document (102) is a freeform document, the key (152) is an attribute describing the value (154). For example, the key (152) may be inferred from the document (102), such as being inferred from the language surrounding the value (154) or other context of the value (154) in the document (102). The value (154) is content corresponding to the key (152). The value (154) may be a numeric value, alphanumeric value, Boolean value, etc. For example, a key (152) in a W-2 document may be "Employee Name" and the corresponding value (154) may be "Mary Jane". A key (152)

may correspond to a value type. The value type is a constraint on the value (154) corresponding to the key (152). For example, if the value type is "numeric" then the value (154) corresponding to the key (152) is constrained to be a numeric value. A confidence score (122A) indicates a probability that the corresponding key-value pair (150A) in the extracted data (120) accurately describes (e.g., matches) the actual key and corresponding actual value in the document (102). Thus, the confidence score indicates the probability that the key-value pair is extracted correctly.

Multiple extractors (104E, 104K) (e.g., third party extractors) may extract extracted data (120) that includes the same key (152). The multiple extractors (104E, 104K) may be based on different extraction techniques. For example, the different extraction techniques might use different natural language processing (NLP) based token classification models, a rules based model, or a graph based token classification model. For example, extractor X may extract the key-value pair ("Employee Name", "Mary Jane") corresponding to confidence score C and extractor Y may extract the key-value pair ("Employee Name", "Mary Jana") corresponding to confidence score D.

Returning to FIG. 1A, the calibrator (106) may be executed on a computing system (e.g., the computing system (500) of FIG. 5A) connected to a network (e.g., the network (520) as shown in FIG. 5B). The calibrator (106) includes a classifier (130) and calibration models (132). The classifier (130) includes functionality to generate match probabilities (136) for extracted data (120).

A match probability (136) is a probability that a key-value pair (150A) in the extracted data (120) is a true positive. A true positive key-value pair matches the actual key-value pair in the document (102). In contrast, a confidence score (122A) indicates a probability that the key-value pair (150A) in the extracted data (120) accurately describes (e.g., matches) the actual key and actual value in the document (102). In other words, the confidence score indicates the probability that the key-value pair is extracted correctly. For example, the key (152) in the extracted data (120) and the actual key in the document (102) match when both are identical string values. Continuing this example, both the key (152) in the extracted data (120) and the actual key in the document (102) may be "State Wages." In one or more embodiments, a key-value pair (150A) in the extracted data (120) matches the actual key-value pair in the document (102) when the key (152) in the extracted data (120) matches the actual key in the document (102) and the value (154) in the extracted data (120) matches the actual value in the document (102). For example, both the key (152) of the extracted data (120) and the actual key in the document (102) may be identical string values and both the value (154) in the extracted data (120) the actual value in the document (102) may be identical numeric values. Continuing this example, both the key (152) in the extracted data (120) and the actual key in the document (102) may be "State Wages" and both the value (154) in the extracted data (120) and the actual value in the document (102) may be 75,000.

The classifier (130) includes functionality to extract a feature vector from the extracted data (120). Examples of features may include one or more of the following features: term frequency-inverse document frequency (TFIDF) vectors, word-length, string-length, location features such as a height and a width of a bounding box in the document enclosing the value, value type, number of special characters in the string, number of values extracted from the document, the horizontal distance between the key and the value, the vertical-distance between the key and the value, the edit distance between the extracted key and the key to which the extracted key-value pair was matched, etc. Another example of a feature is a confidence score (122A) for the key-value pair (150A).

The classifier (130) may learn the mapping of features to match probabilities based on a supervised training data set. In one or more embodiments, each record in the training data set includes one or more key-value pairs and one or more feature vectors labeled with an outcome indicating whether each key-value pair is a match (i.e., a true positive) or a mismatch (i.e., a false positive). The classifier may be an ensemble model including a collection of one or more weak learning models (e.g., learning models that perform slightly better than random chance). The classifier (130) may learn the mapping of features to match probabilities by calculating the percentage of weak learning models that gave a positive classification output.

In one or more embodiments, the classifier (130) is implemented as an ensemble of decision trees. For example, a random forest generally performs reliably in the presence of extreme class imbalances and/or outliers. The decision tree may include internal nodes corresponding to random learnable splits along feature dimensions. The branches (e.g., edges) of the decision tree may represent values of the features. For example, the decision tree may be split based on maximum Shannon entropy gain at each successive split. The feature vector may be weighted according to the information theory definition of entropy of the feature values.

In one or more embodiments, a path through the decision tree includes a series of branches terminating at a leaf node. The series of branches may correspond to the values of a feature vector for a key-value pair, where the feature vector assigns a feature value to each feature. The leaf node is a value belonging to a target class. The target class may be "match" (e.g., positive) or "no-match" (e.g., negative). The ratio of decision trees predicting a match for a record may give the match probability for the record.

A calibration model (132) includes functionality to generate a calibrated confidence score (138) for a match probability (136). The calibrated confidence score (138) is a precision calculated for the match probability (136). In one or more embodiments, the precision is based on the number of true positives corresponding to the match probability (136) in a supervised training data set and the number of false positives corresponding to the match probability (136) in the training data set.

The calibration model (132) learns the mapping of match probabilities to precisions based on the training data set. In one or more embodiments, each record in the training data set includes, for a key-value pair, a match probability labeled with an outcome indicating whether the key-value pair is a match (i.e., a true positive) or a mismatch (i.e., a false positive). Using the training data set, a precision lookup table may be created. The precision lookup table maps match probabilities to calibrated confidence scores. The precision lookup table may be used as a reference in order to calibrate a new uncalibrated match probability. The precision lookup table may be constructed as follows: for every match probability P, the quantity TP/(TP+FP) is calculated over all key-value pairs whose match probability is greater than or equal to the particular match probability P. TP refers to the number of key-value pairs in the training data set that are True Positives and FP refers to the number of key-value pairs in the training data set that are False Positives.

The calibration model (132) is applicable to a specific field of the document (102). For example, the calibrator (106) may include different calibration models (132) that are applied to different fields of the document (102). As another example, the different calibrators (106) may be applied to different fields of the document (102). Field-specific calibration enables the generation of fine-grained calibration confidence scores. In contrast, coarse-grained, single calibrator trained over all the fields of a document that averages the precisions of match probabilities for multiple fields may mask a poorly calibrated confidence score. For example, averaging a low precision with higher precisions when calculating an average precision across multiple fields may prevent the identification of a poorly calibrated confidence score for a specific field.

The calibration model (132) may be implemented as various types of deep learning models based on neural networks (e.g., based on convolutional neural networks (CNNs)), random forests, stochastic gradient descent (SGD), a lasso classifier, gradient boosting (e.g., XGBoost), bagging, adaptive boosting (AdaBoost), ridges, elastic nets, Nu Support Vector Regression (NuSVR), etc.). Deep learning, also known as deep structured learning or hierarchical learning, is part of a broader family of machine learning methods based on learning data representations, as opposed to task-specific algorithms.

The calibrator (106) includes functionality to receive extracted data (120) and confidence scores (122) from extractors (104E, 104K). The calibrator (106) includes functionality to transmit the extracted data (120) and calibrated confidence scores (138) to the confidence based selector (108).

The confidence based selector (108) may be executed on a computing system (e.g., the computing system (500) of FIG. 5A) connected to a network (e.g., the network (520) as shown in FIG. 5B). For example, the confidence based selector (108) may be executed on the same computing system that executes the calibrator (106). The confidence based selector (108) includes functionality to select from the extracted data (120) using the calibrated confidence scores (138). The calibrated output (110) includes calibrated confidence scores (138A, 138Z) corresponding to selected key-value pairs (140A, 140Z). For example, the extracted data (120) received by the confidence based selector (108) may include multiple key-value pairs (e.g., extracted from the document (102) by different extractors) for the same key, where the multiple key-value pairs correspond to different calibrated confidence scores (138). The confidence based selector (108) includes functionality to generate a selected key-value pair (e.g., selected key-value pair (140A)) using the multiple key-value pairs and the corresponding calibrated confidence scores (138).

The confidence based selector (108) includes functionality to transmit the calibrated output (110) to a user. For example, the user may display the calibrated output (110) in a graphical user interface (GUI) of a user computing system. In one or more embodiments, the user computing system provides, to a user, a variety of computing functionality. For example, the computing functionality may include word processing, multimedia processing, financial management, business management, social network connectivity, network management, and/or various other functions that a computing device performs for a user.

The user computing system may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system may take the form of the computing system (500) shown in FIG. 5A connected to a network (520) as shown in FIG. 5B. The GUI of the user computing system may be rendered and displayed within a local desktop software application or the GUI may be generated by a remote web server and transmitted to a user's web browser executing locally on a desktop or mobile device.

While FIG. 1A shows a configuration of components, other configurations may be used without departing from the scope of the invention. For example, various components may be combined to create a single component. As another example, the functionality performed by a single component may be performed by two or more components.

Figure 2:
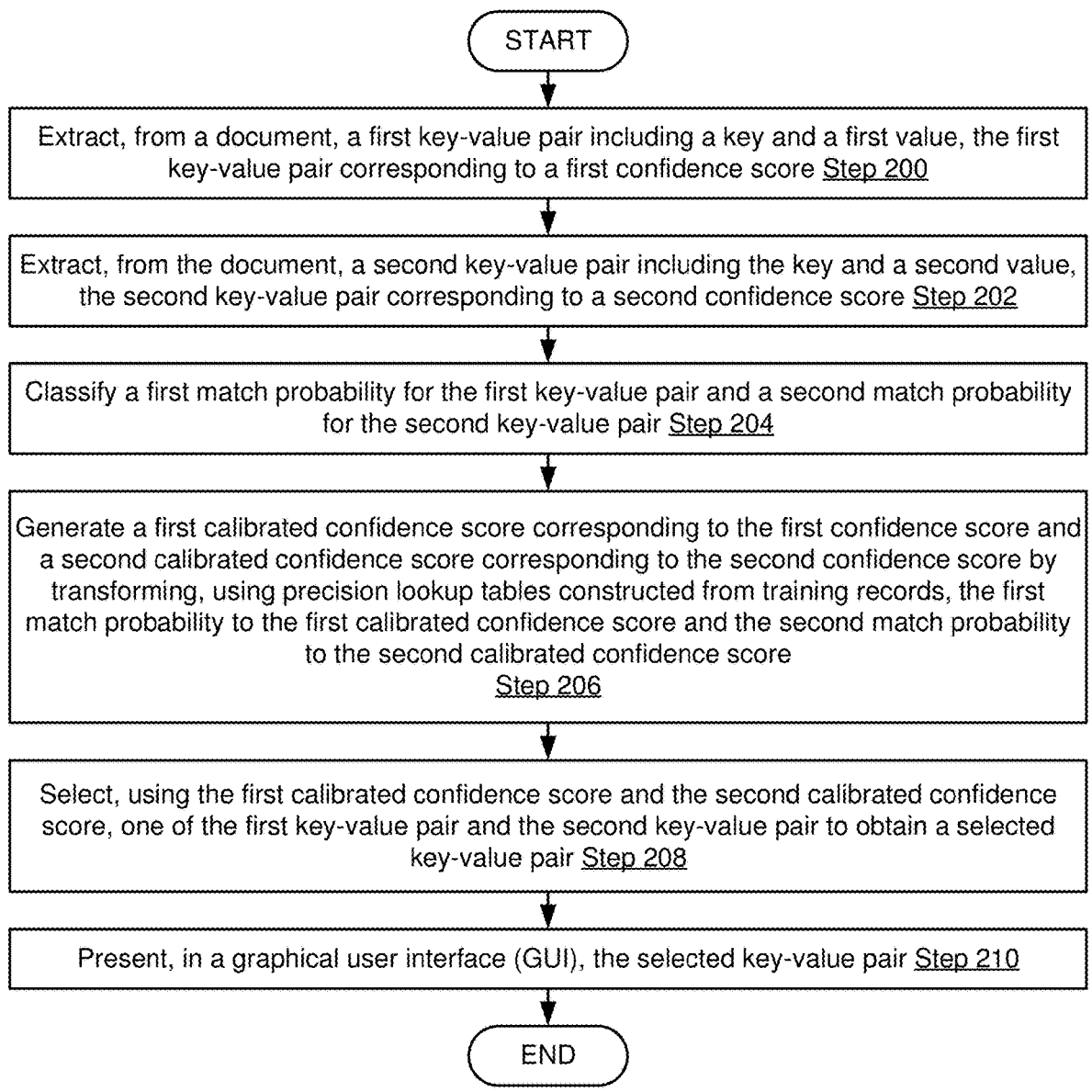
FIG. 2 and FIG. 3 show flowcharts in accordance with one or more embodiments of the invention.

FIG. 2 shows a flowchart in accordance with one or more embodiments of the invention. The flowchart depicts a process for calibrating confidence scores. One or more of the steps in FIG. 2 may be performed by the components (e.g., the extractors (104E, 104K), calibrator (106), and confidence based selector (108) of the system (100)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, a first key-value pair including a first key and a first value is extracted from a document. The key is an identifier (e.g., a field name) of a field of the document. A first extractor may extract the first key-value pair from the document. The first key-value pair corresponds to a first confidence score. The first extractor may extract the first key-value pair from text extracted from the document by an optical character recognizer (OCR). For example, the document may be a scanned image whose text is extracted by the OCR. The OCR may transmit the text to the first extractor. The text may correspond to an OCR confidence score indicating a probability that the extracted text accurately describes (e.g., matches) the actual text in the document. As another example, a PDF extractor may extract the text from a document represented in Portable Data Format (PDF). Continuing this example, the first extractor may extract the first key-value pair from the text extracted by the PDF extractor.

A document type may be obtained for the document. For example, the document type may be obtained from a user who provides the document. The document type may be used to determine the first extractor. For example, the document type may be "W2 form" and the first extractor may be an extractor that is designed for the document type "W2 form." As another example, the document type may be obtained from an OCR or the first extractor.

In Step 202, a second key-value pair including the first key and a second value is extracted from the document (see description of Step 200 above). A second extractor may extract the second key-value pair from the document. The second key-value pair corresponds to a second confidence score.

In Step 204, a first match probability for the first key-value pair and a second match probability for the second key-value pair are classified. The calibrator generates a first feature vector for the first key-value pair and a second feature vector for the second key-value pair. The first feature vector may include the first confidence score and/or an OCR confidence score. The second feature vector may include the second confidence score and/or an OCR confidence score. For example, each feature vector may include one or more of the following features for the corresponding key-value pair: word-length, string-length, location features such as a height and a width of a bounding box in the document enclosing the value, etc. The calibrator generates the first match probability by applying a classifier to the first feature vector. Similarly, the calibrator generates the second match probability by applying the classifier to the second feature vector. In one or more embodiments, the classifier generates each match probability by traversing a path through a decision tree. The classifier may be selected using the document type. As described in Step 200 above, the document type may be obtained from a user who provides the document, from an OCR, or from an extractor. For example, different classifiers may be used to generate match probabilities for key-value pairs extracted from documents of different document types.

In Step 206, a first calibrated confidence score corresponding to the first confidence score and a second calibrated confidence score corresponding to the second confidence score are generated. The calibrated confidence scores are generated by applying a calibration model to the corresponding match probabilities. In one or more embodiments, the calibration model is implemented as a precision lookup-table constructed from training data. Each lookup from the precision lookup table may be used to transform a match probability to a corresponding calibrated confidence score. The calibration model generates the calibrated confidence scores by obtaining precisions corresponding to the match probabilities. The calibration model calculates the precision using the number of true positives corresponding to the match probability in the training data and the number of false positives corresponding to the match probability in the training data.

In Step 208, one of the first key-value pair and the second key-value pair is selected, using the first calibrated confidence score and the second calibrated confidence score, to obtain a selected key-value pair. For example, the confidence based selector may select the key-value pair corresponding to the higher (e.g., more precise) calibrated confidence score. The confidence based selector may generate calibrated output that includes, for one or more fields of the document, a selected key-value pair and a calibrated confidence score corresponding to the selected key-value pair. If there is a single key-value pair for a specific field of the document (e.g., a single extractor extracts data for the specific field), then the confidence based selector selects the single key-value pair for the specific field.

If the confidence based selector determines that the calibrated confidence score corresponding to the selected key-value pair is below a threshold, the confidence based selector may annotate the selected key-value pair with a flag indicating a low calibrated confidence score.

In Step 210, the selected key-value pair is presented in a graphical user interface (GUI). The GUI may display the selected key-value pair using a visual cue when the calibrated confidence score corresponding to the selected key-value pair is below a threshold. For example, the GUI may display the selected key-value pair using a visual cue when the selected key-value pair is annotated with a flag indicating a low calibrated confidence score. Continuing this example, the visual cue may be highlighting the selected key-value pair. As another example, the visual cue may be marking an "x" in a checkbox corresponding to the selected key-value pair. The GUI may display one or more selected key-value pairs for one or more fields of the calibrated output for the document.

Displaying key-value pairs with low calibrated confidence scores using a visual cue improves the user experience by focusing the user's attention on low-precision data when reviewing the results of document extraction. Because precision, unlike probability, is calculated using true positives and false positives, highlighting low-precision (e.g., unreliable) data is more advantageous to the user experience than highlighting low-probability data. This is because incorrect values with high confidence (i.e., False Positives) which the precision calculation takes into consideration, may be harmful to a user's review experience. In contrast, True Negatives (i.e., incorrect values with low confidence) which the probability calculation takes into consideration, are less consequential to the users.

Figure 3:
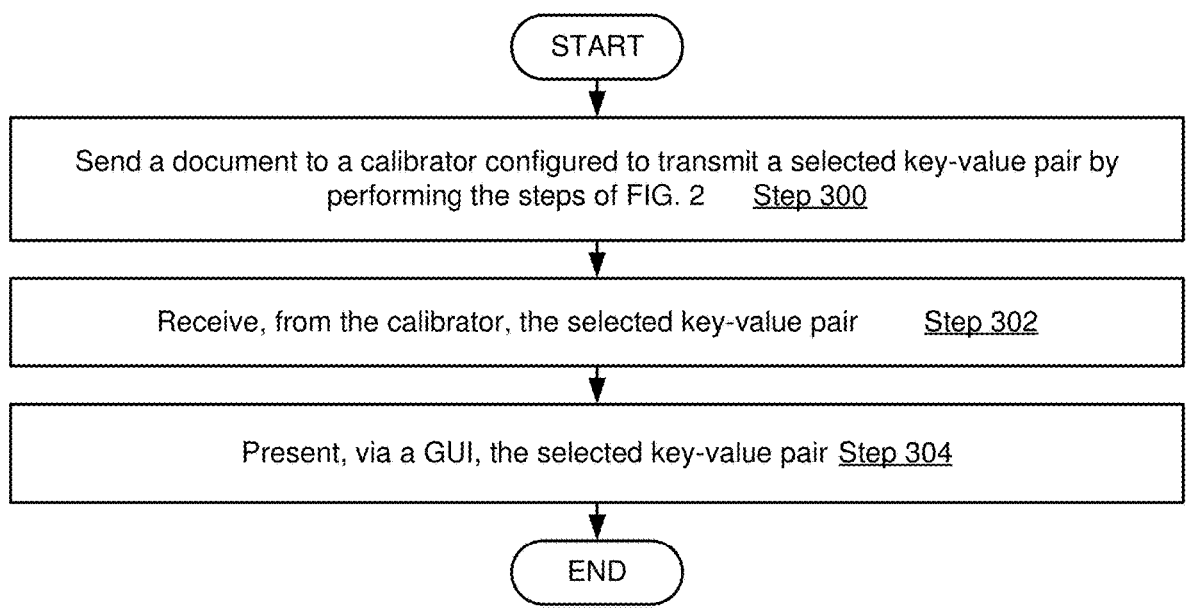

FIG. 3 shows a flowchart in accordance with one or more embodiments of the invention. The flowchart depicts a process for calibrating confidence scores. One or more of the steps in FIG. 3 may be performed by the components (e.g., the extractors (104E, 104K), calibrator (106), and confidence based selector (108) of the system (100)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, a document is sent to a calibrator configured to transmit a selected key-value pair by performing the steps of FIG. 2. The document may be sent to the calibrator over a network.

In Step 302, the selected key-value pair is received from the calibrator. The selected key-value pair may be received from the calibrator via the network.

In Step 304, the selected key-value pair is presented in a graphical user interface (GUI) (see description of Step 210 above).

Figure 4A:
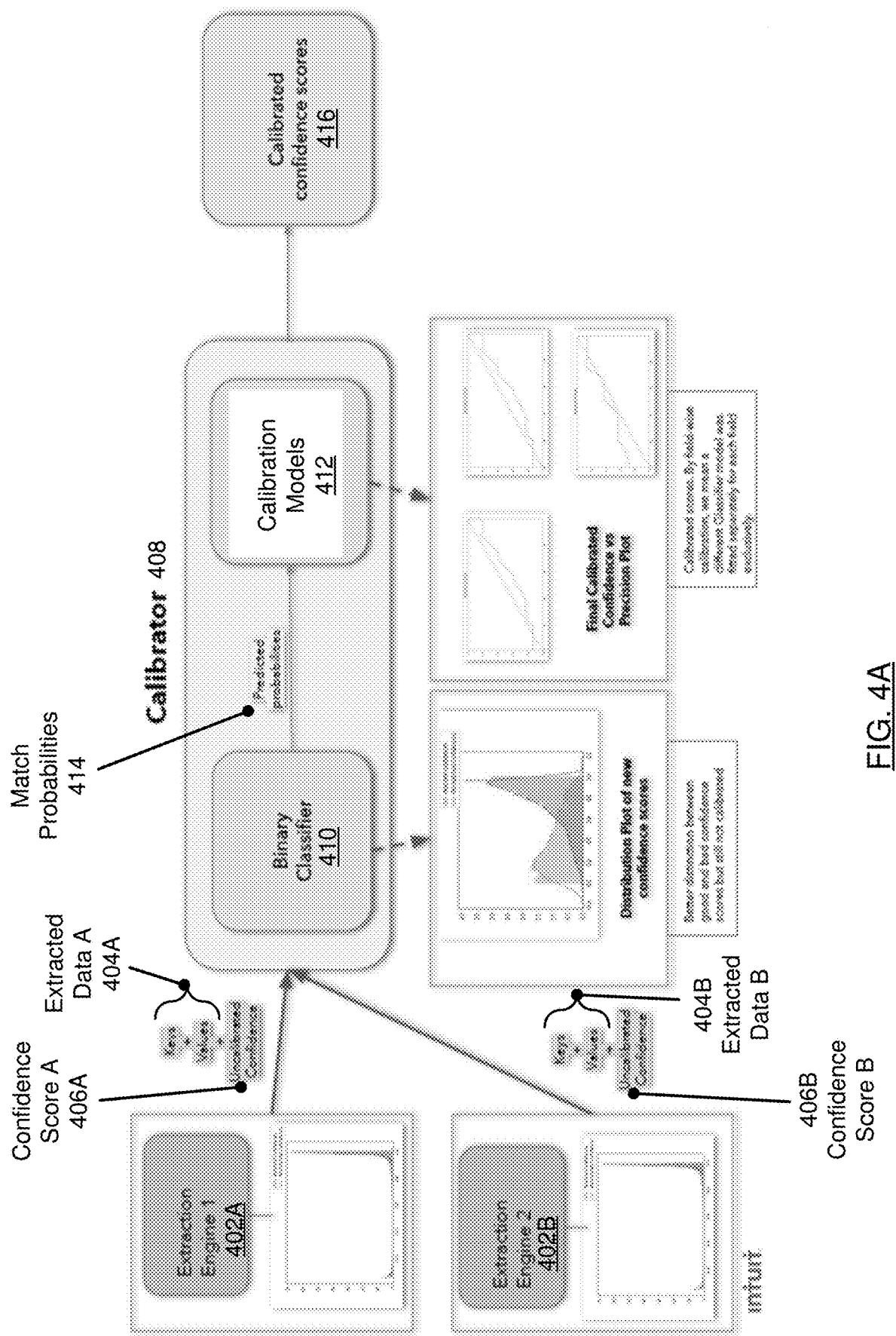
FIG. 4A and FIG. 4B show examples in accordance with one or more embodiments of the invention.
Figure 4B:
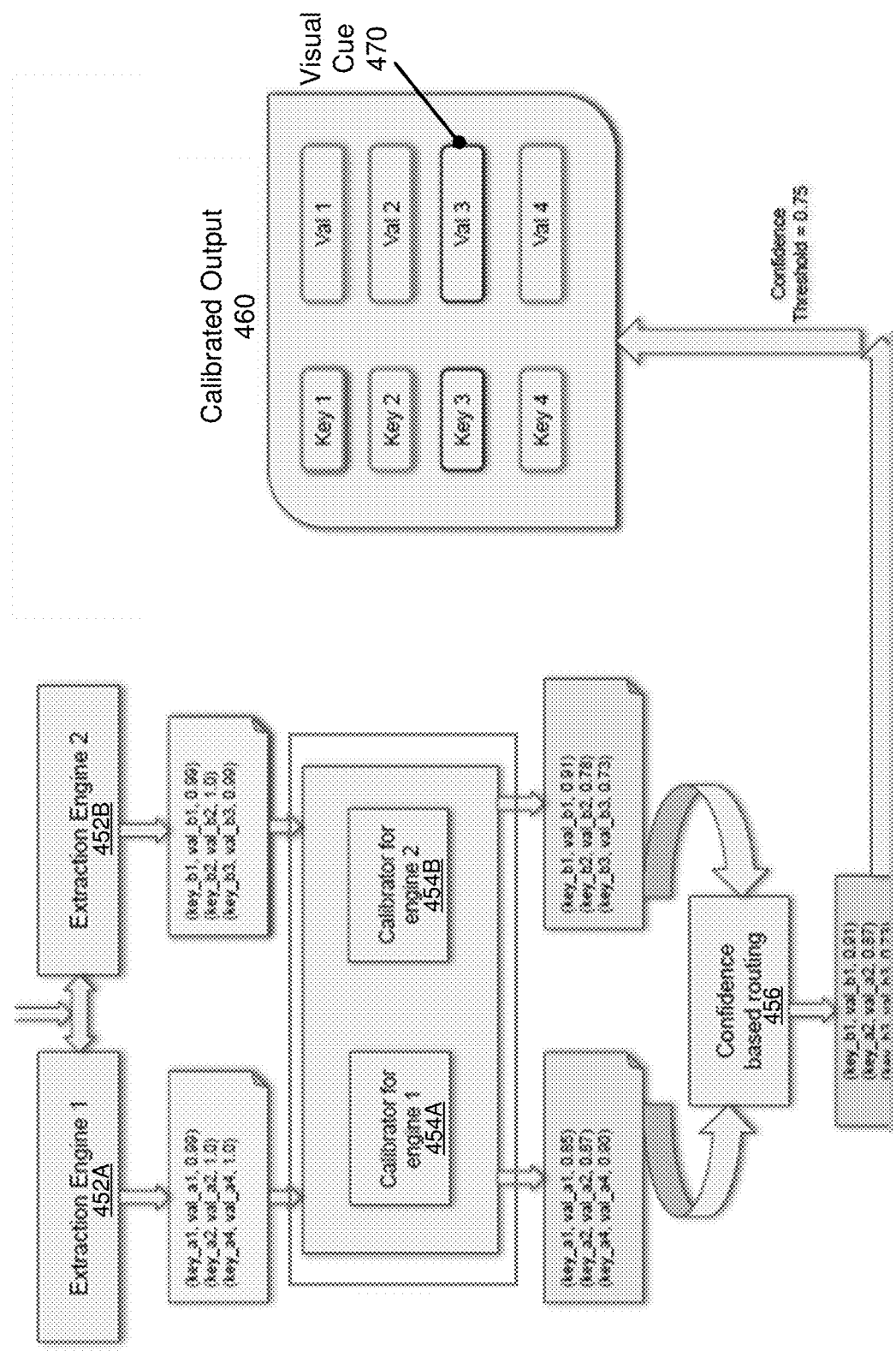

The following example is for explanatory purposes only and not intended to limit the scope of the invention. FIG. 4A and FIG. 4B show an implementation example in accordance with one or more embodiments of the invention. FIG. 4A shows extraction engines (402A, 402B) ((104E, 104K) in FIG. 1A), a calibrator (408) ((106) in FIG. 1A), and calibrated confidence scores (416) ((138) in FIG. 1A). The extraction engines (402A, 402B) extract extracted data (404A, 404B) ((120) in FIG. 1A and FIG. 1B) from a document and assign confidence scores (406A, 406B) ((122) in FIG. 1A and (122A, 122B) in FIG. 1B) to the extracted data (404A, 404B). The extracted data (404A, 404B) includes key-value pairs each including a key and a value, where the key identifies a field of the document.

The calibrator (408) receives the extracted data (404A, 404B) and the confidence scores (406A, 406B) from the extraction engines (402A, 402B). The calibrator (408) applies a binary classifier (410) ((130) in FIG. 1A) to the confidence scores (406A, 406B) and feature vectors generated from the extracted data (404A, 404B) to generate match probabilities (414) ((136) in FIG. 1A). The calibrator (408) applies calibration models (412) ((132) in FIG. 1A) to the match probabilities (414) to generate calibrated confidence scores (416) using precisions obtained from a precision lookup table corresponding to the match probabilities (414).

FIG. 4B shows extraction engines (452A, 452B), calibrators (454A, 454B), a confidence based routing (456) ((108) in FIG. 1A), and calibrated output (460) ((110) in FIG. 1A). Both extraction engines (452A, 452B) are fed the same input document. Extraction engine 1 (452A) extracts the following key-value pairs: (i) key a1, value a1, with a confidence score of 0.99, (ii) key a2, value a2, with a confidence score of 1.0, and (iii) key a4, value a4, with a confidence score of 1.0. Extraction engine 2 (452B) extracts the following key-value pairs: (i) key b1, value b1, with a confidence score of 0.99, (ii) key b2, value b2, with a confidence score of 1.0, and (iii) key b3, value b3, with a confidence score of 0.99. The confidence scores corresponding to the data extracted by the extraction engines (452A, 452B) indicate a high-level, nearly perfect level of confidence.

Calibrators (454A, 454B) generate calibrated confidence scores corresponding to the confidence scores of extraction engines (452A, 452B). The calibrator for engine 1 (454A) generates the following calibrated confidence scores for the key-value pairs extracted by extraction engine 1 (452A): (i) key a1, value a1, with a calibrated confidence score of 0.85, (ii) key a2, value a2, with a calibrated confidence score of 0.87, and (iii) key a4, value a4, with a calibrated confidence score of 0.90. The calibrator for engine 2 (454B) generates the following calibrated confidence scores for the key-value pairs extracted by extraction engine 2 (452B): (i) key b1, value b1, with a calibrated confidence score of 0.91, (ii) key b2, value b2, with a calibrated confidence score of 0.78, and (iii) key b3, value b3, with a calibrated confidence score of 0.73.

The confidence based routing (456) generates calibrated output (460) based on selecting the key-value pairs corresponding to the larger (e.g., more precise) calibrated confidence scores for fields 1 and 2. That is, the confidence based routing (456) selects key b1, value b1 for field 1, because the calibrated confidence score of 0.91 corresponding to key b1, value b1 is higher than the calibrated confidence score of 0.85 corresponding to key a1, value a1. The confidence based routing (456) selects key a2, value a2 for field 2, because the calibrated confidence score of 0.87 corresponding to key a2, value a2 is higher than the calibrated confidence score of 0.78 corresponding to key b2, value b2. The confidence based routing (456) includes key b3, value b3 for field 3 in the calibrated output (460) because a single extractor has provided extracted data for field 3. Similarly, the confidence based routing (456) includes key a4, value a4 for field 4 in the calibrated output (460) because a single extractor has provided extracted data for field 4. The confidence based routing (456) flags key b3, value b3 as low precision, because the calibrated confidence score of 0.73 corresponding to key b3, value b3 is below a threshold of 0.75. When the calibrated output (460) is presented to a user for review, key b3, value b3 is displayed with a visual cue, in this case, highlighting.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   extracting, from a scanned document by a first software extractor, a first key-value pair comprising a first key and a first value, the first key-value pair corresponding to a first confidence score, wherein the first confidence score is a probability that the first key matches an actual key in the scanned document and that the first value matches an actual value for the actual key;
   extracting, from the scanned document by a second software extractor, a second key-value pair comprising the first key and a second value, the second key-value pair corresponding to a second confidence score, wherein the second confidence score is a probability that the first key matches the actual key in the scanned document and that the second value matches the actual value for the actual key, wherein the first key extracted by the second software extractor and the first key extracted by the first software extractor are a same key, and wherein the second software extractor is different than the first software extractor;
   generating, from the first key-value pair, a first feature vector comprising a first location feature and the first confidence score, wherein the first location feature is determined from a first location of the first key with respect to a second location of the first value within the scanned document;
   generating, from the second key-value pair, a second feature vector comprising a second location feature and the second confidence score, wherein the second location feature is determined from the first location of the first key with respect to a third location of the second value within the scanned document;
   classifying, by a classifier and using the first location feature in the first feature vector, the first feature vector to generate a first match probability for the first key-value pair;
   classifying, by the classifier and using the second location feature in the second feature vector, the second feature vector to generate a second match probability for the second key-value pair;
   generating a first calibrated confidence score corresponding to the first confidence score and a second calibrated confidence score corresponding to the second confidence score by transforming, using precision lookup tables constructed from training records, the first match probability to the first calibrated confidence score and the second match probability to second calibrated confidence score;
   selecting, using the first calibrated confidence score and the second calibrated confidence score, one of the first key-value pair and the second key-value pair to obtain a selected key-value pair; and
   presenting, in a graphical user interface (GUI), the selected key-value pair.

2. The method of claim 1, further comprising:
training the classifier using training records each comprising, for a key-value pair, a feature vector labeled with an outcome indicating whether the key-value pair is a match.

3. The method of claim 2, wherein the first calibrated confidence score and the second calibrated confidence score are generated by a calibration model, the method further comprising:
training the calibration model using the training records each comprising, for a key-value pair, a training match probability labeled with an outcome indicating whether the key-value pair is a match,
wherein the calibration model comprises functionality to calculate a precision for the match probability using a number of training records in a first subset of the training records that are matches and a number of training records in a second subset of the training records that are mismatches,
wherein each training record in the first subset comprises the training match probability that is at least the match probability, and
wherein each training record in the second subset comprises the training match probability that is at least the match probability.

4. The method of claim 1, further comprising:
extracting, from the scanned document and by an optical character recognizer (OCR), first text corresponding to an OCR confidence score, wherein the first feature vector further comprises the OCR confidence score; and
transmitting, by the OCR and to an extractor, the first text, wherein the extractor extracts the first key-value pair from the first text.

5. The method of claim 1, further comprising:
obtaining a document type for the scanned document; and
selecting the classifier using the document type.

6. The method of claim 1, further comprising:
extracting, from the scanned document, a third key-value pair comprising a second key and a third value, the third key-value pair corresponding to a third confidence score;
classifying a third match probability for the third key-value pair;
generating a third calibrated confidence score corresponding to the third confidence score;
determining that the third calibrated confidence score is below a threshold; and
responsive to determining that the third calibrated confidence score is below the threshold, presenting, in the GUI and using a visual cue, the third key-value pair.

7. A system comprising:
a computer processor;
a first software extractor configured to extract, from a scanned document, a first key-value pair comprising a first key and a first value, the first key-value pair corresponding to a first confidence score, wherein the first confidence score is a probability that the first key matches an actual key in the scanned document and that the first value matches an actual value for the actual key;
a second software extractor configured to extract, from the scanned document, a second key-value pair comprising the first key and a second value, the second key-value pair corresponding to a second confidence score, wherein the second confidence score is a probability that the first key matches the actual key in the scanned document and that the second value matches the actual value for the actual key, wherein the first key extracted by the second software extractor and the first key extracted by the first software extractor are a same key, and wherein the second software extractor is different than the first software extractor;
a calibrator, separate from the first software extractor and the second software extractor, executing on the computer processor, and configured to:
generate, from the first key-value pair, a first feature vector comprising a first location feature and the first confidence score, wherein the first location feature is determined from a first location of the first key with respect to a second location of the first value within the scanned document,
generate, from the second key-value pair, a second feature vector comprising a second location feature and the second confidence score, wherein the second location feature is determined from the first location of the first key with respect to a third location of the second value within the scanned document,
classify, using the first location feature in the first feature vector, the first feature vector to generate a first match probability for the first key-value pair,
classify, using the second location feature in the second feature vector, the second feature vector to generate a second match probability for the second key-value pair, and
generate a first calibrated confidence score corresponding to the first confidence score and a second calibrated confidence score corresponding to the second confidence score by transforming, using precision lookup tables constructed from training records, the first match probability to the first calibrated confidence score and the second match probability to second calibrated confidence score;
a confidence based selector configured to select, using the first calibrated confidence score and the second calibrated confidence score, one of the first key-value pair and the second key-value pair to obtain a selected key-value pair; and
a graphical user interface (GUI) configured to present the selected key-value pair.

8. The system of claim 7, wherein the calibrator is further configured to:
train the classifier using training records each comprising, for a key-value pair, a feature vector labeled with an outcome indicating whether the key-value pair is a match.

9. The system of claim 8, wherein the first calibrated confidence score and the second calibrated confidence score are generated by a calibration model, and wherein the calibrator is further configured to:
train the calibration model using the training records each comprising, for a key-value pair, a training match probability labeled with an outcome indicating whether the key-value pair is a match,
wherein the calibration model comprises functionality to calculate a precision for the match probability using a number of training records in a first subset of the training records that are matches and a number of training records in a second subset of the training records that are mismatches,
wherein each training record in the first subset comprises the training match probability that is at least the match probability, and wherein each training record in the second subset comprises the training match probability that is at least the match probability.

10. The system of claim 7, further comprising an optical character recognizer (OCR),
wherein the OCR is configured to:
extract, from the scanned document, first text corresponding to an OCR confidence score, wherein the first feature vector further comprises the OCR confidence score, and
transmit, to the first software extractor, the first text, and
wherein the first extractor is further configured to extract the first key-value pair from the first text.

11. The system of claim 7,
wherein the first software extractor is further configured to obtain a document type for the scanned document, and
wherein the calibrator is further configured to select the classifier using the document type.

12. The system of claim 7,
wherein the first software extractor is further configured to extract, from the scanned document, a third key-value pair comprising a second key and a third value, the third key-value pair corresponding to a third confidence score,
wherein the calibrator is further configured to:
classify a third match probability for the third key-value pair,
generate a third calibrated confidence score corresponding to the third confidence score, and
determine that the third calibrated confidence score is below a threshold, and
wherein the GUI is further configured to: responsive to determining that the third calibrated confidence score is below the threshold, present, using a visual cue, the third key-value pair.

13. A method, comprising:
sending a scanned document to a calibrator configured to perform:
obtaining, from a first software extractor accessing the scanned document, a first key-value pair comprising a first key and a first value, the first key-value pair corresponding to a first confidence score, wherein the first confidence score is a probability that the first key matches an actual key in the scanned document and that the first value matches an actual value for the actual key,
obtaining, from a second software extractor accessing the scanned document, a second key-value pair comprising the first key and a second value, the second key-value pair corresponding to a second confidence score, wherein the second confidence score is a probability that the first key matches the actual key in the scanned document and that the second value matches the actual value for the actual key, wherein the first key extracted by the second software extractor and the first key extracted by the first software extractor are a same key, and wherein the second software extractor is different than the first software extractor,
generating, from the first key-value pair, a first feature vector comprising a first location feature and the first confidence score, wherein the first location feature is determined from a first location of the first key with respect to a second location of the first value within the scanned document,
generating, from the second key-value pair, a second feature vector comprising a second location feature and the second confidence score, wherein the second location feature is determined from the first location of the first key with respect to a third location of the second value within the scanned document,
classifying, by a classifier and using the first location feature in the first feature vector, the first feature vector to generate a first match probability for the first key-value pair,
classifying, by the classifier and using the second location feature in the second feature vector, the second feature vector to generate a second match probability for the second key-value pair,
generating a first calibrated confidence score corresponding to the first confidence score and a second calibrated confidence score corresponding to the second confidence score by transforming, using precision lookup tables constructed from training records, the first match probability to the first calibrated confidence score and the second match probability to second calibrated confidence score, and
selecting, using the first calibrated confidence score and the second calibrated confidence score, one of the first key-value pair and the second key-value pair to obtain a selected key-value pair;
receiving, from the calibrator, the selected key-value pair; and
presenting, in a graphical user interface (GUI), the selected key-value pair.

14. The method of claim 13, wherein the calibrator is further configured to perform:
training the classifier using training records each comprising, for a key-value pair, a feature vector labeled with an outcome indicating whether the key-value pair is a match.

15. The method of claim 14, wherein the first calibrated confidence score and the second calibrated confidence score are generated by a calibration model, and wherein the calibrator is further configured to perform:
training the calibration model using the training records each comprising, for a key-value pair, a training match probability labeled with an outcome indicating whether the key-value pair is a match,
wherein the calibration model comprises functionality to calculate a precision for the match probability using a number of training records in a first subset of the training records that are matches and a number of training records in a second subset of the training records that are mismatches,
wherein each training record in the first subset comprises the training match probability that is at least the match probability, and
wherein each training record in the second subset comprises the training match probability that is at least the match probability.

16. The method of claim 13, wherein the calibrator is further configured to perform:
extracting, from the scanned document and by an optical character recognizer (OCR), first text corresponding to an OCR confidence score, wherein the first feature vector further comprises the OCR confidence score; and
transmitting, by the OCR and to an extractor, the first text, wherein the extractor extracts the first key-value pair from the first text.

17. The method of claim 13, wherein the calibrator is further configured to perform:
- extracting, from the scanned document, a third key-value pair comprising a second key and a third value, the third key-value pair corresponding to a third confidence score;
- classifying a third match probability for the third key-value pair;
- generating a third calibrated confidence score corresponding to the third confidence score;
- determining that the third calibrated confidence score is below a threshold; and
- responsive to determining that the third calibrated confidence score is below the threshold, presenting, in the GUI and using a visual cue, the third key-value pair.

* * * * *